United States Patent
Haenel et al.

(10) Patent No.: US 8,677,370 B2
(45) Date of Patent: Mar. 18, 2014

(54) GENERATING RESOURCE CONSUMPTION CONTROL LIMITS

(75) Inventors: Walter Haenel, Holzgerlingen (DE); Stefan Hepper, Holzgerlingen (DE)

(73) Assignee: International Business Machines Corporation, Armonk, NY (US)

(*) Notice: Subject to any disclaimer, the term of this patent is extended or adjusted under 35 U.S.C. 154(b) by 1407 days.

(21) Appl. No.: 12/140,310

(22) Filed: Jun. 17, 2008

(65) Prior Publication Data

US 2009/0313632 A1   Dec. 17, 2009

(51) Int. Cl.
*G06F 9/46*   (2006.01)

(52) U.S. Cl.
USPC .......................................................... 718/104

(58) Field of Classification Search
USPC .......................................................... 718/104
See application file for complete search history.

(56) References Cited

U.S. PATENT DOCUMENTS

| | | | |
|---|---|---|---|
| 6,920,110 B2* | 7/2005 | Roberts et al. | 370/235 |
| 2004/0054749 A1 | 3/2004 | Doyle et al. | |
| 2005/0010388 A1* | 1/2005 | Bagchi et al. | 703/22 |
| 2005/0021917 A1* | 1/2005 | Mathur et al. | 711/159 |
| 2007/0006318 A1 | 1/2007 | Allamaraju et al. | |
| 2007/0136329 A1 | 6/2007 | Kussmaul et al. | |
| 2009/0006971 A1 | 1/2009 | Guido et al. | |
| 2009/0070457 A1* | 3/2009 | McKinney | 709/224 |
| 2009/0100372 A1 | 4/2009 | Lauridsen et al. | |
| 2010/0017385 A1 | 1/2010 | Wilcox et al. | |
| 2010/0077073 A1 | 3/2010 | Haenel et al. | |

OTHER PUBLICATIONS

Oracle Application Server 10g High Availability; An Oracle White Paper Jan. 2004; 22 pages; Link.
Myong et al.; Switching to Enterprise-Scale Databases in Sun Java System Portal Server for Collaboration; 7 pages.
Abdelnur; JSR286 (Portlets 2.0), First Impressions; 4 pages.
USPTO Office Action (Mail Date Feb. 16, 2011) for U.S. Appl. No. 12/236,697, filed Sep. 24, 2008; Confirmation No. 8399.
Notice of Allowance (Mail Date Apr. 28, 2011) for U.S. Appl. No. 12/236,697, filed Sep. 24, 2008; Confirmation No. 8399.

* cited by examiner

*Primary Examiner* — Mengyao Zhe
(74) *Attorney, Agent, or Firm* — Schmeiser, Olsen & Watts; Jeff Tang

(57) ABSTRACT

A resource consumption control method and system. The method includes deploying by a computing system, a portlet/servlet. The computing system receives monitor data associated with a first resource consumed by the first portlet/servlet during the deploying. The monitor data comprises a maximum resource consumption rate value for the portlet/servlet and a mean resource consumption rate value for the portlet/servlet. The computing system generates a resource consumption rate limit value for the first portlet/servlet based on the monitor data. The computing system generates action data comprising an action to be executed if the resource consumption rate limit value is exceeded by a consumption rate value for the portlet/servlet. The computing system transmits the resource consumption rate limit value and the action data to the portlet/servlet. The resource consumption rate limit value and the action data are stored with the portlet/servlet.

21 Claims, 4 Drawing Sheets

GENERATING RESOURCE CONSUMPTION CONTROL LIMITS

FIELD OF THE INVENTION

The present invention relates to a method and associated system for generating resource consumption control limits and associated actions.

BACKGROUND OF THE INVENTION

Generating system control operations typically comprises an inefficient process with little flexibility. Accordingly, there exists a need in the art to overcome at least some of the deficiencies and limitations described herein above.

SUMMARY OF THE INVENTION

The present invention provides a resource consumption control method comprising:

first deploying, by a computing system, a first portlet/servlet;

receiving, by said computing system in response to said first deploying, first monitor data associated with a first resource consumed by said first portlet/servlet during said first deploying, wherein said first monitor data comprises a maximum resource consumption rate value for said first portlet/servlet and a mean resource consumption rate value for said first portlet/servlet;

generating, by said computing system based on said first monitor data, a first resource consumption rate limit value for said first portlet/servlet;

generating, by said computing system, first action data comprising a first action to be executed if said first resource consumption rate limit value is exceeded by a consumption rate value for said first portlet/servlet; and transmitting by said computing system, said first resource consumption rate limit value and said first action data to said first portlet/servlet, wherein said first resource consumption rate limit value and said first action data are stored with said first portlet/servlet.

The present invention provides a computing system comprising a processor coupled to a computer-readable memory unit, said memory unit comprising a resource server software application and instructions that when executed by the processor implements a resource consumption control method, said method comprising:

first deploying, by said computing system, a first portlet/servlet;

receiving, by said computing system in response to said first deploying, first monitor data associated with a first resource consumed by said first portlet/servlet during said first deploying, wherein said first monitor data comprises a maximum resource consumption rate value for said first portlet/servlet and a mean resource consumption rate value for said first portlet/servlet;

generating, by said computing system based on said first monitor data, a first resource consumption rate limit value for said first portlet/servlet;

generating, by said computing system, first action data comprising a first action to be executed if said first resource consumption rate limit value is exceeded by a consumption rate value for said first portlet/servlet; and transmitting by said computing system, said first resource consumption rate limit value and said first action data to said first portlet/servlet, wherein said first resource consumption rate limit value and said first action data are stored with said first portlet/servlet.

The present invention advantageously provides a simple method and associated system capable of generating system control operations.

DETAILED DESCRIPTION OF THE INVENTION

Figure 1:
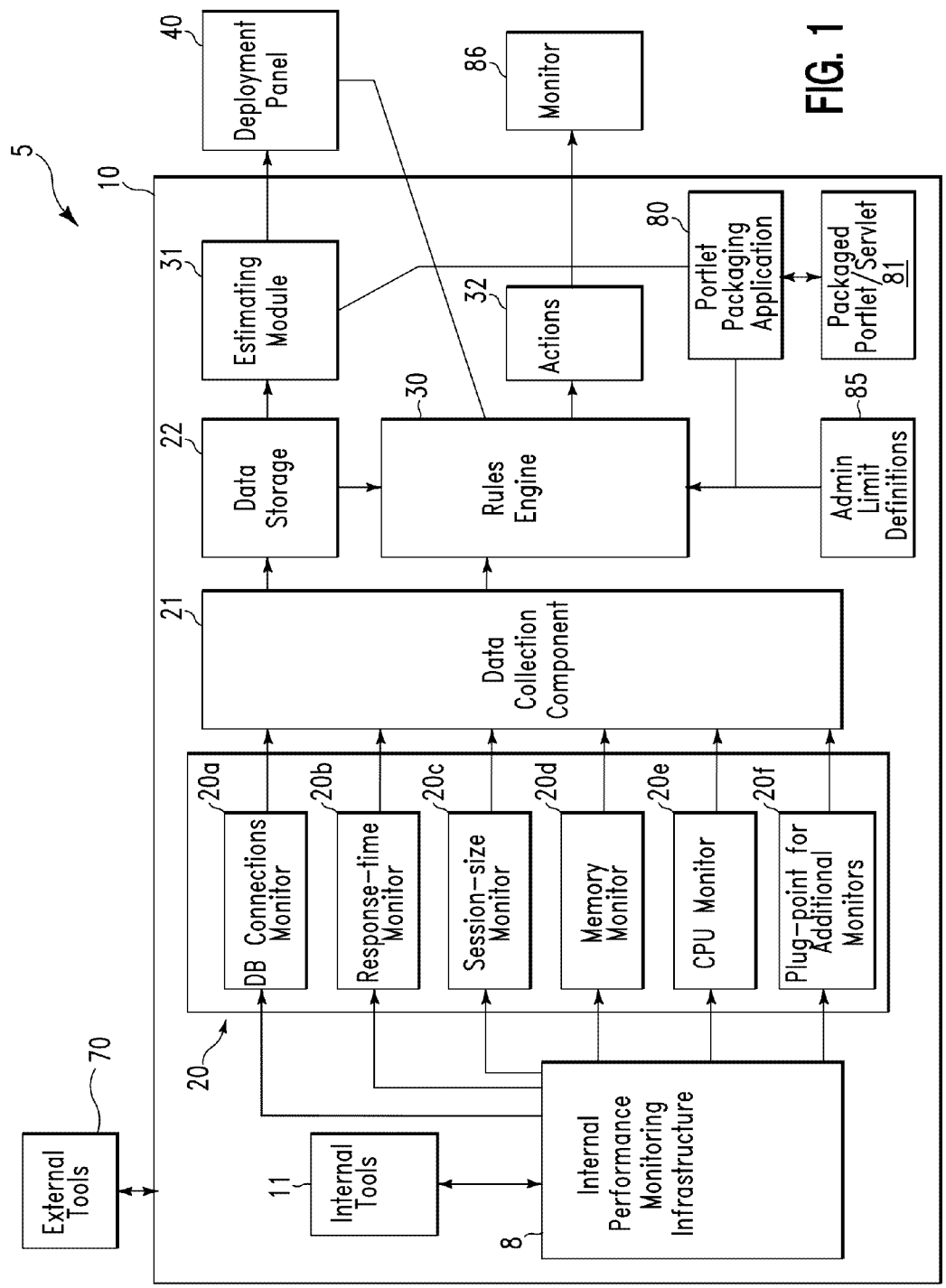
FIG. 1 illustrates a system for generating resource consumption control limits and associated actions for a servlet(s) or a portlet(s), in accordance with embodiments of the present invention.

FIG. 1 illustrates a system 5 for generating resource consumption control limits and associated actions for a servlet(s) or a portlet(s), in accordance with embodiments of the present invention. A servlet is defined herein as a computer program that is executed on a server (e.g., a Java code that is executed within a Web server environment). A portlet is defined herein as a Web-based component (i.e., from a portal) that processes requests and generates dynamic content (e.g., a specialized area of content within a Web page). System 2 executes an algorithm(s) that generates resource consumption rate limits and associated actions to be executed if the resource consumption rate limits (or a percentage of the resource consumption rate limits) are exceeded. The resource consumption rate limits may be generated by retrieving monitor data (e.g., comprising maximum resource consumption rate values and mean resource consumption rate values for a servlet(s) or a portlet(s)) and using the monitor data to generate the resource consumption rate limits. The resource consumption rate limits address unexpected resource (e.g., computer memory, central processing unit (CPU), computer connections, etc.) consumption by a portlet (or servlet) by measuring resource consumption values of the portlet (or servlet) and comparing the resource consumption values against a specified resource consumption value limit(s) generated by system 5. Once the specified resource consumption value limit(s) is reached, specified actions (i.e. generated by system 5) may be executed to prevent additional resource consumption by the portlet (or servlet). For example, the portlet (or servlet) may be disabled for a specified time period. Additionally, portlets may be relocated from one portal to another in order to better distribute a workload on all available systems. System 5 generates and attaches the specified resource consumption value limit(s) and associated actions to the portlet (or servlet). The specified resource consumption value limit(s) and associated actions may be generated and attached to a portlet (or servlet) during a testing procedure in a staging environment. The specified resource consumption value limit(s) may be generated automatically by learning correct values during a training session. The specified resource consumption value limit(s) may then be attached to the portlet (e.g., stored in a deployment descriptor of the portlet (or servlet) or stored in packaged portlet or servlet 81 (WAR or EAR file)) which in turn may be deployed in a production environment.

System 5 of FIG. 1 comprises:
1. A computing system 10 (e.g., an application server).
2. Resource monitors 20.
3. A data collection component 21.
4. A data storage system 22.
5. A rules engine 30 (e.g., a software application).
6. An estimating software module 31.
7. Actions 32.
8. A deployment panel 40.
9. Internal tools for performance monitoring/external performance monitoring software tools 70. These tools are used to analyze performance data retrieved from internal performance monitoring infrastructure 8.
10. A portlet packaging software application 80.
11. Packaged portlet/servlet 81 to be packaged with consumption data.
12. A monitor 86.
13. Administrator limit definitions 85.

Computing system 10 may comprise, inter alia, a personal computer, a laptop computer, a computer terminal, a server computer, etc. Computing system 10 may comprise a single computing apparatus or a plurality of computing apparatuses. Monitors 20 comprise various different monitors for each resource type. For example, a database connections monitor 20*a*, a response time monitor 20*b*, a session size monitor 20*c*, a memory monitor 20*d*, a CPU monitor 20*e*, a plug point for additional monitors 20*f*, etc. Monitors 20 are responsible for collecting performance relevant data (i.e., related to resources) and providing the data in a common format. Data collection component 21 is responsible for collecting data from all registered monitors 20. Additionally, data collection component 21 provides a history of data and stores data via data storage system 22. Data Storage system 22 stores actual and history of performance data for single portlets/servlets as well as for an entire runtime environment. Rules engine 30 retrieves data from data storage system 22 and compares the data to predefined rules and limit definitions in an action to be executed. Estimating software module 31 retrieves available data from data storage system 22 and provides an estimate for adequate limit values for a portlet or servlet. The estimate for adequate limit values is calculated by a statistical analysis of resource consumption and a required availability level of the portlet or servlet. As an example, if a response time of the portlet or servlet illustrates a Gaussian distribution, adding multiples of the standard derivation to the mean value sigma will calculate how many requests will be inside the limit. For example adding 6 sigma (i.e., multiples of the standard derivation) will guarantee that only one of 1,000,000 requests will take more time. Thus for a portlet or servlet classified as "business critical", estimating software module 31 may propose a limit of the mean value plus 6 sigma. Likewise, for a portlet or servlet that is only classified as "informal", estimating software module 31 may add only 3 sigma to the mean value to lower the maximum resource consumption. The portlet or servlet classification may be provided by the administrator over the console. Additionally, based on the statistics of the resource consumption, estimating software module 31 will propose percentage values for lower level actions, such as, inter alia, log entries, informing an administrator, etc. Actions 32, execute a programmable action (e.g., issuing an alert, sending an email, disabling an application, etc.). Deployment panel 40 visualizes a current system state and allows estimating software module 31 to propose limits and percentage values to an administrator. Portlet packaging holding application 80 comprises definition files such as, inter alia, Web.xml, Portlet.XML, etc. Included in these application definition files are limits for resource consumption defined by the staging system. Administrator limit definitions 85 are generated by an administrator defining limits for resource consumption. In order to generate resource consumption limit values, a portlet/servlet is deployed (i.e., executed) to a staging environment (i.e. staging environment is equipped with tools (e.g., comprised by computing system 10) for measuring resource consumption). The tools may be integrated in a portal server or an application server. Resource consumption may include, inter alia:
1. Portlet memory consumption.
2. Portlet session size.
3. Portlet response time. Portlet response time includes an overall time that a portlet needs to answer to a request. This includes a waiting time for external resources such as, inter alia, databases and backend systems.
4. Portlet CPU consumption.

The tools (e.g., comprised by computing system 10) are instructed to measure resource consumption during a normal run under load and to learn maximum resource consumption values and mean resource consumption values (i.e., by estimating module 31). Measuring resource consumption may require runs of several days or weeks. Once measurements are completed, automated actions may be defined by an administrator. Automated actions may be executed when a specific resource consumption limit value, a specified percentage of a specific resource consumption limit value, or a combination of resource consumption limit values are reached. For example, a portlet could be taken out of service (i.e., disabled) if a memory limit is reached and the portal (i.e., comprising the portlet) is under heavy load. This may include an overall memory consumption and CPU load of the portal server. If the portal is not under heavy load, the reaction to crossing the memory limit may comprise lowering a priority of requests going to the portlet. Resource consumption limits may be generated by the following steps:
1. Deploy (enanble) a portlet to a staging system. The staging system is set up to accept unprofiled portlets.
2. Generate tests to determine resource consumption (usage) in a production environment.
3. During the tests, a typical and maximum and mean resource consumption value is recorded.
4. An administrator may view the results from step 3, modify resource consumption limits for the portlet, and generate activities/actions to be executed at the resource consumption limit value and/or at a given percentage of the resource consumption limit value. For Example:
   A. A log entry (i.e., an action) may be created at 80% of a maximum resource consumption limit value.
   B. A message may be transmitted (i.e., an action) to an administrator at 90% of the maximum resource consumption limit value.
   C. The portlet may be deactivated (i.e., an action) if the maximum resource consumption limit value is reached.
5. Transmit the maximum resource consumption limit value and the actions back to the portlet for storage.

Figure 2:
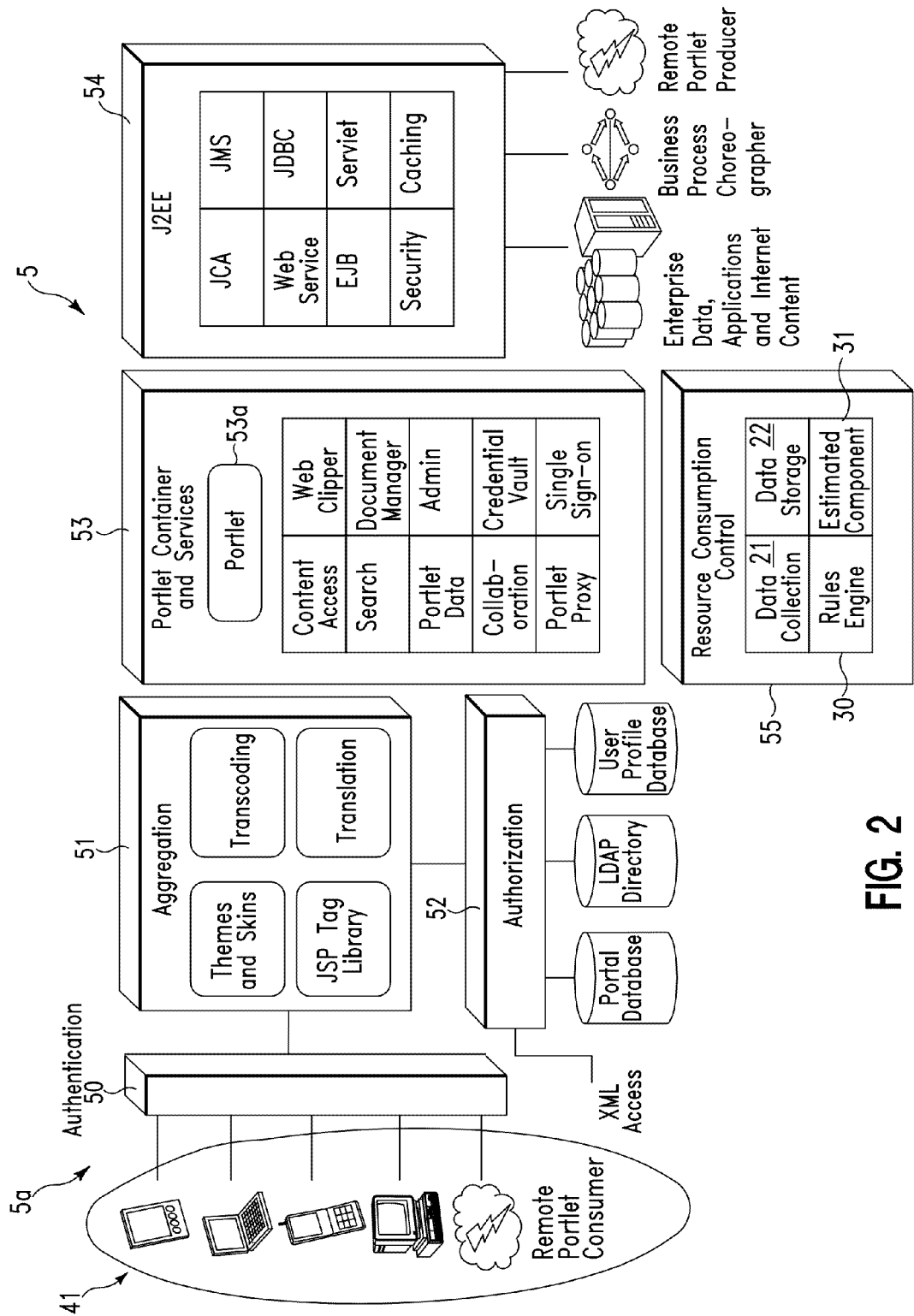
FIG. 2 illustrates a system depicting a portal example for implementing the system of FIG. 1 for controlling resource consumption by a portlet, in accordance with embodiments of the present invention.

FIG. 2 illustrates a system 5*a* depicting a portal example for implementing system 5 of FIG. 1 for controlling resource consumption by a portlet 53*a*, in accordance with embodiments of the present invention. System 5*a* comprises:
1. End devices 41.
2. An authentication component 50.
3. Page aggregation 51.

4. An authorization component 52.
5. A portlet container & services 53.
6. A Java EE
7. A resource consumption control module 55.

End devices 50 comprise devices (e.g., computers, telephones, etc) that are running browsers for accessing a portal. Authentication component 50 authenticates an incoming user. Page aggregation 51 aggregates different artifacts and fragments (e.g., themes and skins, transcoding, translation, JSP library, etc) into a single page and determines which portlets 53a are on a current page. Authorization component 52 determines resources that a current user may access. Portlet container & services 53 comprises a runtime environment for portal that runs the portlets 53a. Java EE 54 comprises additional services (e.g., JCA, JMS, Web services, JDBC, etc) provided by a Java EE runtime. Resource consumption control module 55 comprises data collection component 21, data storage system 22, rules engine 30 (e.g., a software application), and estimating software module 31 of FIG. 1. Resource consumption control module 55 interacts with portlet container and services 53 in order to monitor portlets 53a, complete page performance numbers, and overall system parameters such as CPU load or memory consumption.

Figure 3:
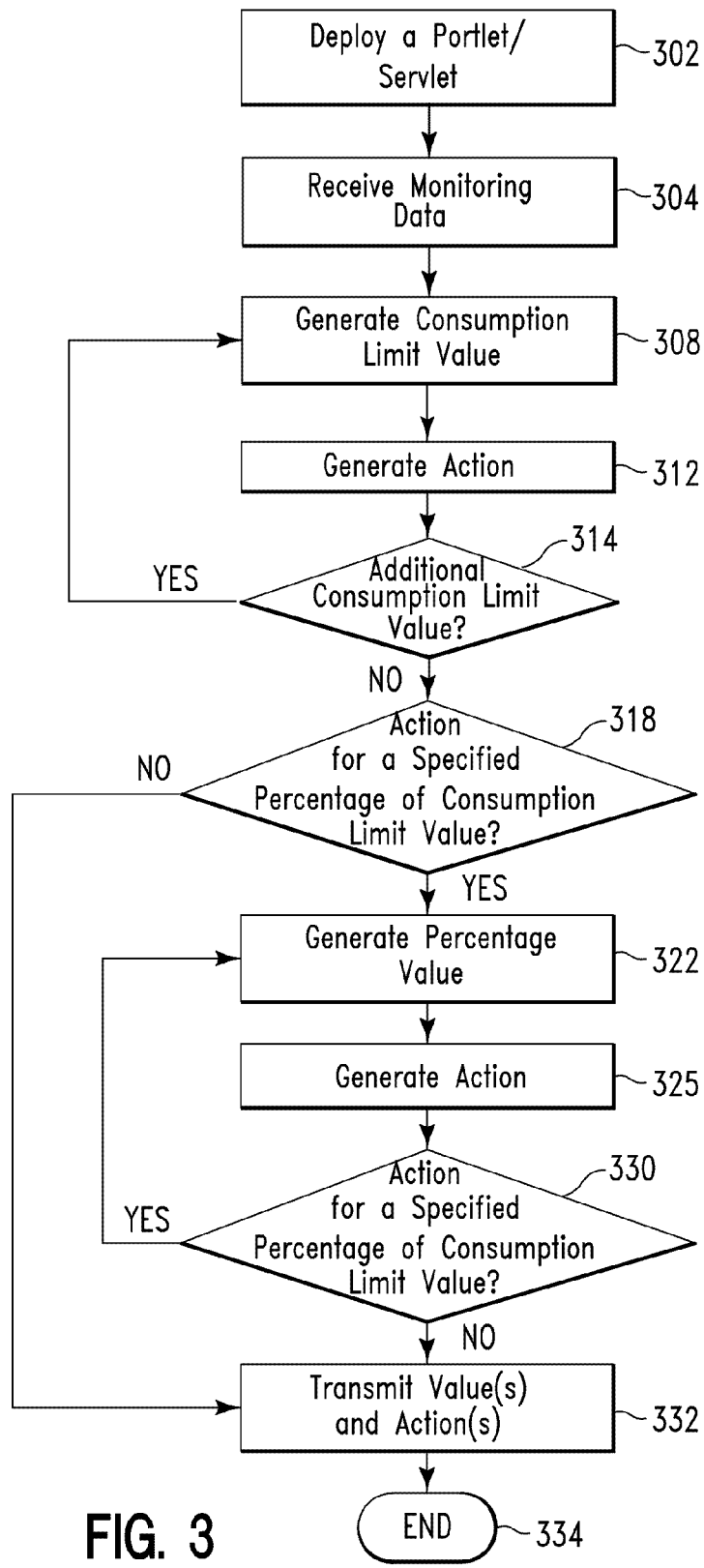
FIG. 3 illustrates a flowchart describing an algorithm used by the system of FIG. 1 for generating resource consumption limit values and associated actions, in accordance with embodiments of the present invention.

FIG. 3 illustrates a flowchart describing an algorithm used by system 5 of FIG. 1 for generating resource consumption limit values and associated actions, in accordance with embodiments of the present invention. In step 302, a computing system (e.g., computing system 10 of FIG. 1) deploys a portlet (or servlet). In step 304, the computing system (i.e., in response to step 302) receives monitor data associated with a resource consumed by the portlet (or servlet). The monitor data may comprise a maximum resource consumption rate value for the portlet (or servlet) and a mean resource consumption rate value for the portlet (or servlet). In step 308, the computing system (i.e., estimating module 31) generates (i.e., based on the monitor data) a resource consumption rate limit value for the portlet (or servlet). In step 312, the computing system generates action data (e.g., in response to an administrator command) comprising at least one action to be executed if the resource consumption rate limit value is exceeded by an actual resource consumption rate for the portlet. In step 314, it is determined (e.g., by an administrator or by computing system 10) if any additional resource consumption rate limit values for the portlet (or servlet) should be generated. If in step 314, it is determined that additional resource consumption rate limit values for the portlet (or servlet) should be generated then step 308 is repeated. If in step 314, it is determined that additional resource consumption rate limit values for the portlet (or servlet) should not be generated then in step 318, it is determined if an action should be executed if a consumption rate value for the portlet or (servlet) exceeds a specified percentage value of the resource consumption rate limit value.

If in step 318, it is determined that an action should not be executed if a consumption rate value for the portlet or (servlet) exceeds a specified percentage value of the resource consumption rate limit value then in step 332, the resource consumption rate limit value for the portlet (or servlet) generated in step 308 and the associated action generated in step 312 are transmitted to packaging application 80 which includes packaged portlet/servlet 81. The resource consumption rate limit value and the associated action may be stored in a deployment descriptor of the portlet (or servlet).

If in step 318, it is determined that an action should be executed if a consumption rate value for the portlet or (servlet) exceeds a specified percentage value of the resource consumption rate limit value then in step 322, a percentage value for the resource consumption rate limit value is calculated. In step 325, an action (e.g., a warning, a shut down command, etc) associated with the percentage value (from step 322) is generated. In step 330, it is determined if a second action should be executed if the consumption rate value for the portlet or (servlet) exceeds a second specified percentage value of the resource consumption rate limit value. If in step 330 it is determined that a second action should be executed if the consumption rate value for the portlet or (servlet) exceeds a second specified percentage value of the resource consumption rate limit value then step 322 is repeated. If in step 330 it is determined that a second action should not be executed if the consumption rate value for the portlet or (servlet) exceeds a second specified percentage value of the resource consumption rate limit value then in step 332, values (i.e., from steps 308 and 322) and actions (i.e., from steps 312 and 322) are transmitted to the portlet (or servlet) and stored by the portlet (or servlet). The values and the associated actions may be stored in a deployment descriptor of the portlet (or servlet). The above described process may be repeated for additional portlets or (servlets) or combinations of additional portlets or (servlets).

Figure 4:
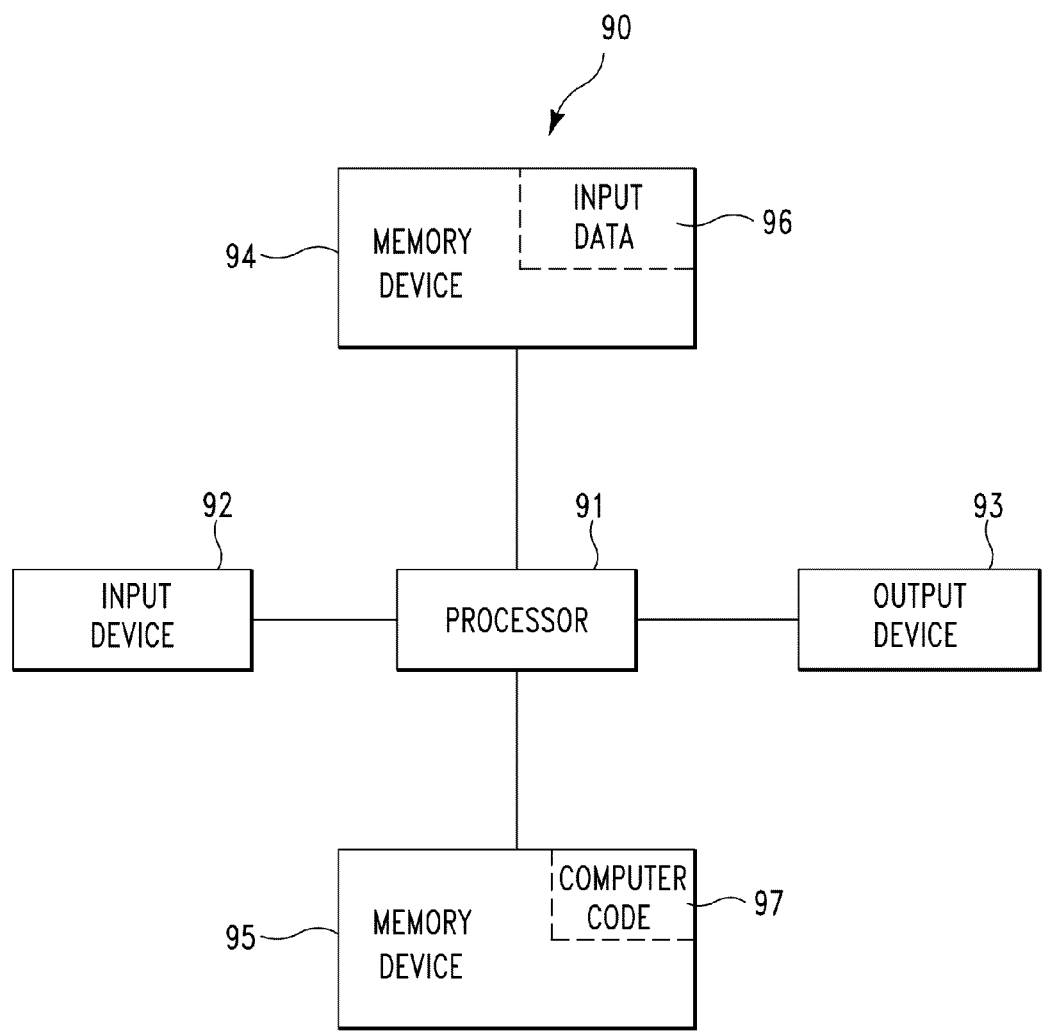
FIG. 4 illustrates a computer apparatus used for generating resource consumption control limits and associated actions for a servlet(s) or a portlet(s), in accordance with embodiments of the present invention.

FIG. 4 illustrates a computer apparatus 90 (e.g., computing system 10 of FIG. 1) used for generating resource consumption control limits and associated actions for a servlet(s) or a portlet(s), in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for generating resource consumption control limits and associated actions for a servlet(s) or a portlet(s). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to generate resource consumption control limits and associated actions for a servlet(s) or a portlet(s). Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating resource consumption control limits and associated actions for a servlet(s) or a portlet(s). In another embodiment, the invention provides a business method that performs the process steps of the invention on a subscription, advertising, and/or fee basis. That is, a service provider, such as a Solution Integrator, could offer to generate resource consumption control limits and associated actions for a servlet(s) or a portlet(s). In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A resource consumption control method comprising:

first deploying, by a computing system, a first portlet/servlet;

receiving, by said computing system in response to said first deploying, first monitor data associated with a first resource consumed by said first portlet/servlet during said first deploying, wherein said first monitor data comprises a maximum resource consumption rate value for said first portlet/servlet and a mean resource consumption rate value for said first portlet/servlet;

generating, by said computing system based on said first monitor data, a first resource consumption rate limit value for said first portlet/servlet;

generating, by said computing system, first action data comprising a first action to be executed if said first resource consumption rate limit value is exceeded by a consumption rate value for said first portlet/servlet;

transmitting, by said computing system, said first resource consumption rate limit value and said first action data to said first portlet/servlet, wherein said first resource consumption rate limit value and said first action data are stored with said first portlet/servlet;

generating, by said computing system, a specified percentage value of said first resource consumption rate limit value, said specified percentage value indicating a first specified portion of said first resource consumption rate limit value;

generating, by said computing system, second action data comprising a second action to be executed if consumption rate value for said first portlet/servlet exceeds said specified percentage value of said first resource consumption rate limit value, wherein said second action comprises generating warning data indicating that said consumption rate value for said first portlet/servlet exceeds said specified percentage value of said first resource consumption rate limit value;

transmitting by said computing system, said specified percentage value and said second action data to said first portlet/servlet;

comparing, by said computing system, said consumption rate value to said first resource consumption rate limit value;

first determining, by said computing system based on said comparing said consumption rate value to said first resource consumption rate limit value, that said resource consumption rate value exceeds said first resource consumption rate limit value;

executing, by said computing system, said first action, wherein said executing said first action comprises transmitting a warning message to an administrator, and wherein said warning message indicates that said consumption rate value exceeds said first resource consumption rate limit value;

receiving, by said computing system from said administrator in response to said warning message, a second resource consumption rate limit value and second action data, wherein said second resource consumption rate limit value is greater than said first resource consumption rate limit value and said consumption rate value, and wherein said second action data comprises a second action to be executed if said second resource consumption rate limit value is exceeded by a first resource consumption rate value for said first portlet/servlet during said first deploying;

disabling, by said computing system, said first portlet/servlet;

replacing, by said computing system, said first resource consumption rate limit value with said second resource consumption rate limit value;

second deploying, by said computing system in response to said replacing, said first portlet/servlet;

receiving, by said computing system in response to said second deploying, second monitor data associated with said first resource consumed by said first portlet/servlet during said second deploying, wherein said second monitor data comprises said first resource consumption rate value for said first portlet/servlet during said second deploying;

comparing, by said computing system in response to said receiving said second monitor data, said first resource consumption rate value to said second resource consumption rate limit value; and second determining, by said computing system based on said comparing said first resource consumption rate value to said second resource consumption rate limit value, if said first resource consumption rate value exceeds said second resource consumption rate limit value.

2. The method of claim 1, further comprising:

generating, by said computing system, a second specified percentage value of said first resource consumption rate limit value;

generating, by said computing system, third action data comprising a third action to be executed if said consumption rate value for said first portlet/servlet exceeds said second specified percentage value of said first resource consumption rate limit value; and transmitting by said computing system, said second specified percentage value and said third action data to said first portlet/servlet.

3. The method of claim 1, further comprising:
generating, by said computing system based on said first monitor data, a second resource consumption rate limit value for said first portlet/servlet;
generating, by said computing system, second action data comprising a second action to be executed if said resource consumption rate value for said for said first portlet/servlet is less than said second resource consumption rate limit value; and
transmitting by said computing system, said second resource consumption rate limit value and said second action data to said first portlet/servlet.

4. The method of claim 3, further comprising:
generating, by said computing system, a first specified percentage value of said second resource consumption rate limit value;
generating, by said computing system, third action data comprising a third action to be executed if said consumption rate value for said first portlet/servlet exceeds said first specified percentage value of said second resource consumption rate limit value; and
transmitting by said computing system, said first specified percentage value and said third action data to said first portlet/servlet.

5. The method of claim 1, further comprising:
second deploying, by said computing system, a second portlet/servlet, wherein said second portlet/servlet differs from said first portlet/servlet;
receiving, by said computing system in response to said second deploying, second monitor data associated with said first resource consumed by said second portlet/servlet during said second deploying, wherein said second monitor data comprises a maximum resource consumption rate value for said second portlet/servlet and a mean resource consumption rate value for said second portlet/servlet;
generating, by said computing system based on said first monitor data and said second monitor data, a second resource consumption rate limit value for said second portlet/servlet and said first portlet/servlet;
generating, by said computing system, second action data comprising a second action to be executed if said first resource consumption rate limit value is exceeded by said exceeded by said consumption rate value for said first portlet/servlet and said second resource consumption rate limit value is exceeded by a consumption rate value for said second portlet/servlet; and
transmitting by said computing system, said second resource consumption rate limit value and said second action data to said second portlet/servlet, wherein said second resource consumption rate limit value and said second action data are stored in a deployment descriptor of said second portlet/servlet.

6. The method of claim 1, wherein said first action comprises disabling said first portlet/servlet.

7. The method of claim 1, wherein said first portlet/servlet is a servlet.

8. The method of claim 1, wherein said first portlet/servlet is a portlet.

9. The method of claim 1, wherein said first resource consumption rate limit value is generated based on a statistical evaluation of said consumption rate value during runtime and a required availability level of said first portlet/servlet.

10. The method of claim 1, wherein said wherein said first resource consumption rate limit value and said first action data are stored within a deployment descriptor of said first portlet/servlet.

11. The method of claim 1, wherein said wherein said first resource consumption rate limit value and said first action data are stored within a packaging of said first portlet/servlet.

12. A computer program product, comprising a computer storage device storing a computer readable program code, said computer readable program code configured to perform a method upon being executed by a processor of a computing system, said method comprising:
first deploying, by a computing system, a first portlet/servlet;
receiving, by said computing system in response to said first deploying, first monitor data associated with a first resource consumed by said first portlet/servlet during said first deploying, wherein said first monitor data comprises a maximum resource consumption rate value for said first portlet/servlet and a mean resource consumption rate value for said first portlet/servlet;
generating, by said computing system based on said first monitor data, a first resource consumption rate limit value for said first portlet/servlet;
generating, by said computing system, first action data comprising a first action to be executed if said first resource consumption rate limit value is exceeded by a consumption rate value for said first portlet/servlet;
transmitting, by said computing system, said first resource consumption rate limit value and said first action data to said first portlet/servlet, wherein said first resource consumption rate limit value and said first action data are stored with said first portlet/servlet;
generating, by said computing system, a specified percentage value of said first resource consumption rate limit value, said specified percentage value indicating a first specified portion of said first resource consumption rate limit value;
generating, by said computing system, second action data comprising a second action to be executed if said consumption rate value for said first portlet/servlet exceeds said specified percentage value of said first resource consumption rate limit value, wherein said second action comprises generating warning data indicating that said consumption rate value for said first portlet/servlet exceeds said specified percentage value of said first resource consumption rate limit value;
transmitting by said computing system, said specified percentage value and said second action data to said first portlet/servlet;
comparing, by said computing system, said consumption rate value to said first resource consumption rate limit value;
first determining, by said computing system based on said comparing said consumption rate value to said first resource consumption rate limit value, that said resource consumption rate value exceeds said first resource consumption rate limit value;
executing, by said computing system, said first action, wherein said executing said first action comprises transmitting a warning message to an administrator, and wherein said warning message indicates that said consumption rate value exceeds said first resource consumption rate limit value;
receiving, by said computing system from said administrator in response to said warning message, a second resource consumption rate limit value and second action data, wherein said second resource consumption rate limit value is greater than said first resource consumption rate limit value and said consumption rate value, and wherein said second action data comprises a second action to be executed if said second resource consumption rate limit value is exceeded by a first resource consumption rate value for said first portlet/servlet during said first deploying;

disabling, by said computing system, said first portlet/servlet;

replacing, by said computing system, said first resource consumption rate limit value with said second resource consumption rate limit value;

second deploying, by said computing system in response to said replacing, said first portlet/servlet;

receiving, by said computing system in response to said second deploying, second monitor data associated with said first resource consumed by said first portlet/servlet during said second deploying, wherein said second monitor data comprises said first resource consumption rate value for said first portlet/servlet during said second deploying;

comparing, by said computing system in response to said receiving said second monitor data, said first resource consumption rate value to said second resource consumption rate limit value; and second determining, by said computing system based on said comparing said first resource consumption rate value to said second resource consumption rate limit value, if said first resource consumption rate value exceeds said second resource consumption rate limit value.

13. A computing system comprising a processor coupled to a computer-readable memory unit, said memory unit comprising a resource server software application and instructions that when executed by the processor implements a resource consumption control method, said method comprising:

first deploying, by said computing system, a first portlet/servlet;

receiving, by said computing system in response to said first deploying, first monitor data associated with a first resource consumed by said first portlet/servlet during said first deploying, wherein said first monitor data comprises a maximum resource consumption rate value for said first portlet/servlet and a mean resource consumption rate value for said first portlet/servlet;

generating, by said computing system based on said first monitor data, a first resource consumption rate limit value for said first portlet/servlet;

generating, by said computing system, first action data comprising a first action to be executed if said first resource consumption rate limit value is exceeded by a consumption rate value for said first portlet/servlet;

transmitting, by said computing system, said first resource consumption rate limit value and said first action data to said first portlet/servlet, wherein said first resource consumption rate limit value and said first action data are stored with said first portlet/servlet;

generating, by said computing system, a specified percentage value of said first resource consumption rate limit value, said specified percentage value indicating a first specified portion of said first resource consumption rate limit value;

generating, by said computing system, second action data comprising a second action to be executed if said consumption rate value for said first portlet/servlet exceeds said specified percentage value of said first resource consumption rate limit value, wherein said second action comprises generating warning data indicating that said consumption rate value for said first portlet/servlet exceeds said specified percentage value of said first resource consumption rate limit value;

transmitting by said computing system, said specified percentage value and said second action data to said first portlet/servlet;

comparing, by said computing system, said consumption rate value to said first resource consumption rate limit value;

first determining, by said computing system based on said comparing said consumption rate value to said first resource consumption rate limit value, that said resource consumption rate value exceeds said first resource consumption rate limit value;

executing, by said computing system, said first action, wherein said executing said first action comprises transmitting a warning message to an administrator, and wherein said warning message indicates that said consumption rate value exceeds said first resource consumption rate limit value;

receiving, by said computing system from said administrator in response to said warning message, a second resource consumption rate limit value and second action data, wherein said second resource consumption rate limit value is greater than said first resource consumption rate limit value and said consumption rate value, and wherein said second action data comprises a second action to be executed if said second resource consumption rate limit value is exceeded by a first resource consumption rate value for said first portlet/servlet during said first deploying;

disabling, by said computing system, said first portlet/servlet;

replacing, by said computing system, said first resource consumption rate limit value with said second resource consumption rate limit value;

second deploying, by said computing system in response to said replacing, said first portlet/servlet;

receiving, by said computing system in response to said second deploying, second monitor data associated with said first resource consumed by said first portlet/servlet during said second deploying, wherein said second monitor data comprises said first resource consumption rate value for said first portlet/servlet during said second deploying;

comparing, by said computing system in response to said receiving said second monitor data, said first resource consumption rate value to said second resource consumption rate limit value; and second determining, by said computing system based on said comparing said first resource consumption rate value to said second resource consumption rate limit value, if said first resource consumption rate value exceeds said second resource consumption rate limit value.

14. The computing system of claim 13, wherein said method further comprises:

generating, by said computing system, a second specified percentage value of said first resource consumption rate limit value;

generating, by said computing system, third action data comprising a third action to be executed if said consumption rate value for said first portlet/servlet exceeds said second specified percentage value of said first resource consumption rate limit value; and transmitting by said computing system, said second specified percentage value and said third action data to said first portlet/servlet.

15. The computing system of claim 13, wherein said method further comprises:
   generating, by said computing system based on said first monitor data, a second resource consumption rate limit value for said first portlet/servlet;
   generating, by said computing system, second action data comprising a second action to be executed if said resource consumption rate value for said for said first portlet/servlet is less than said second resource consumption rate limit value; and
   transmitting by said computing system, said second resource consumption rate limit value and said second action data to said first portlet/servlet.

16. The computing system of claim 15, wherein said method further comprises:
   generating, by said computing system, a first specified percentage value of said second resource consumption rate limit value;
   generating, by said computing system, third action data comprising a third action to be executed if said consumption rate value for said first portlet/servlet exceeds said first specified percentage value of said second resource consumption rate limit value; and
   transmitting by said computing system, said first specified percentage value and said third action data to said first portlet/servlet.

17. The computing system of claim 13, wherein said method further comprises:
   second deploying, by said computing system, a second portlet/servlet, wherein said second portlet/servlet differs from said first portlet/servlet;
   receiving, by said computing system in response to said second deploying, second monitor data associated with said first resource consumed by said second portlet/servlet during said second deploying, wherein said second monitor data comprises a maximum resource consumption rate value for said second portlet/servlet and a mean resource consumption rate value for said second portlet/servlet;
   generating, by said computing system based on said first monitor data and said second monitor data, a second resource consumption rate limit value for said second portlet/servlet and said first portlet/servlet;
   generating, by said computing system, second action data comprising a second action to be executed if said first resource consumption rate limit value is exceeded by said exceeded by said consumption rate value for said first portlet/servlet and said second resource consumption rate limit value is exceeded by a consumption rate value for said second portlet/servlet; and
   transmitting by said computing system, said second resource consumption rate limit value and said second action data to said second portlet/servlet, wherein said second resource consumption rate limit value and said second action data are stored in a deployment descriptor of said second portlet/servlet.

18. The computing system of claim 13, wherein said first action comprises disabling said first portlet/servlet.

19. The computing system of claim 13, wherein said first portlet/servlet is a servlet.

20. The computing system of claim 13, wherein said first portlet/servlet is a portlet.

21. The computing system of claim 13, wherein said first resource consumption rate limit value is generated based on a statistical evaluation of said consumption rate value during runtime and a required availability level of said first portlet/servlet.

* * * * *